United States Patent
Ince et al.

(10) Patent No.: US 8,591,120 B2
(45) Date of Patent: Nov. 26, 2013

(54) ROLLING BEARING

(75) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 102 days.

(21) Appl. No.: 13/241,864

(22) Filed: Sep. 23, 2011

(65) Prior Publication Data

US 2012/0106885 A1    May 3, 2012

Related U.S. Application Data

(60) Provisional application No. 61/407,132, filed on Oct. 27, 2010.

(51) Int. Cl.
*F16C 19/24* (2006.01)
*F16C 25/08* (2006.01)

(52) U.S. Cl.
USPC ............ 384/557; 384/493; 384/903; 384/905

(58) Field of Classification Search
USPC .......................... 384/493, 557, 605, 903, 905
See application file for complete search history.

(56) References Cited

U.S. PATENT DOCUMENTS

| | | | |
|---|---|---|---|
| 3,561,829 A * | 2/1971 | Heldt | 384/557 |
| 5,028,152 A | 7/1991 | Hill et al. | |
| 6,273,614 B1 * | 8/2001 | Nicot | 384/493 |

FOREIGN PATENT DOCUMENTS

| | | | | |
|---|---|---|---|---|
| DE | 4221802 A1 * | 1/1994 | | G12B 7/00 |
| DE | 102007045655 A1 * | 4/2009 | | F16C 19/52 |
| WO | WO 2008083650 A1 * | 7/2008 | | F16C 19/52 |

* cited by examiner

*Primary Examiner* — Phillip A Johnson
(74) *Attorney, Agent, or Firm* — Lucas & Mercanti, LLP

(57) ABSTRACT

A rolling bearing which has at least one lash compensation element possessing temperature-dependent extendably arranged on one bearing ring of the rolling bearing. The lash compensation element is surrounded at least partially by an angular ring profile. The angular ring profile has at least one leg directed axially parallel to an axis of rotation of the angular contact roller bearing. The ring profile is retained by the leg by positive axial engagement for limited axial movement on the bearing ring such that the lash compensation element is supported by the ring profile by positive engagement so as to be radially immovable on the bearing ring while being guided for axial movement on the bearing ring.

9 Claims, 3 Drawing Sheets

ROLLING BEARING

CROSS-REFERENCE TO RELATED APPLICATION

This application claims the priority of U.S. 61/407,132 filed on Oct. 27, 2010, which is incorporated herein by reference.

FIELD OF THE INVENTION

The invention concerns a rolling bearing comprising at least one lash compensation element possessing temperature-dependent extendably arranged on one bearing ring of the rolling bearing. The lash compensation element is surrounded at least partially by an angular ring profile.

BACKGROUND OF THE INVENTION

Among rolling bearings, radial rolling bearings, thrust rolling bearings and angular contact rolling bearings are used for the mounting of shafts and other rotatable machine components, preferably in vehicle transmissions. The generic rolling bearings comprise at least one row or a plurality of rows of rolling elements that are supported on rolling contact raceways. The rolling elements are balls and rollers. Rollers of smaller diameter with a certain length are also called needle rollers. At least one of the rolling contact raceways is configured on a bearing ring that can have a one-piece or a multi-piece structure. In particular, in the case of mounting through thrust bearings or angular contact rolling bearings, a lash-free biasing of these rolling bearings is a necessary pre-requisite for their flawless functioning. In angular contact rolling bearing arrangements, for example, two of the angular contact rolling bearings are biased free of lash against each other.

In angular contact rolling bearing arrangements, lash-free biasing means that the angular contact rolling bearings are biased both in radial and in axial direction and that at least movement lashes between the rolling elements and the bearing rings within the angular contact bearings are eliminated. Angular contact bearings are taper roller bearings or angular contact roller bearings or angular contact ball bearings.

The invention relates to all types of rolling bearings for rolling bearing arrangements with which the shafts can be mounted in housings made of materials having higher thermal expansion coefficients than the mounting elements and the mounted elements. The mounting elements are rolling bearings such as radial bearings, thrust bearings and preferably angular contact bearings. The mounted elements are the shafts, gearwheels, differential cages or planet carriers mounted through the rolling bearing arrangement. As a rule, the housings are made out of light metals and their alloys. The mounting and the mounted elements are made as a rule out of steel.

As known, light metals have a higher thermal expansion coefficient than steel. Due to the differences in the thermal expansion coefficients, the housing made of light metal expands more than the mounting and the mounted elements when the temperature rises. As a result, the pre-stresses in the rolling bearing arrangements can be lowered or even nullified. The reduction of pre-stresses results in axial excursion of the biased bearing rings to the point of producing lashes in the bearings with a complete absence of pre-stresses. In addition, this phenomenon known in the technical field is intensified by the fact that the bores of the mounting seats in housings made of the materials possessing the higher thermal expansion coefficients widen radially more than the respective bearing ring arranged in the bore, so that the seats of the rolling bearings in the bores can loosen to the extent of giving rise to radial lashes.

Arrangements also exist in which for compensating lashes, so-called lash compensation elements are used. Through these elements which are mostly spring-elastic, the rolling bearing arrangement is retained under permanent pre-stress. Spring excursion and pre-stress are large enough to compensate expansions even in regions of the largest possible movement lashes. Such spring-elastic elements are, for example, disk springs, ondular washers or coil springs that are clamped axially between one of the axially displaceable bearing rings of one of the angular contact bearings and an axial support fixed on a surrounding part.

As also described in U.S. Pat. No. 5,028,152 A, thermo compensation elements, also called TCE's are used in rolling hearing arrangements. These TCE's are made of a material whose thermal expansion coefficient, as a rule, is much higher than that of the material of the housing. The TCE's are seated on the outer periphery of the respective axially displaceable bearing ring and protrude in axial direction beyond the axially directed front end of the outer ring while being biased against an axial housing-mounted stop. Upon a rise of temperature in the surroundings of the rolling bearing arrangement, the TCE's, due to their higher thermal expansion coefficients, expand more than the housing, so that the axially protruding portion of the TCE's lengthens in axial direction and the pre-stress in the rolling bearing arrangement is maintained. Because, compared to steel and also to light metals, the TCE's are made of a relatively soft material, they are encapsulated at least partially by a U-shaped ring profile. The ring profile is given the shape of the TCE's, and retains them in position while protecting them through the axial stops in the contact zone particularly in contact with the housing.

The housing described in U.S. Pat. No. 5,028,152 A is a ring profile that, in longitudinal section, is configured longitudinally along the central axis of the ring profile or U-shaped along the central axis of the respective angular contact bearing. Viewed in any longitudinal section, the two legs of the U-profile are radially parallel to each other and are oriented in axial direction axially parallel to the central axis. The web that connects the legs is oriented in radial direction and thus crosswise to the central axis. The TCE is supported axially on the housing through the web.

In the rolling bearing arrangement described in U.S. Pat. No. 5,028,152 A, the hearing ring on which the TCE is seated must comprise a valley channel for this seat. By valley channel is to be understood a region on which two surfaces converge and form an inner corner. The surfaces in the present case are a circular ring surface and an outer cylindrical surface. The valley channel must possess axial and radial dimensions that correspond substantially to the dimensions of the TCE. Such a valley channel can be made in a bearing ring only if the bearing ring has adequate axial and radial dimensions. If an insufficient quantity of material remains behind in the regions next to the raceways of the rolling elements for supporting the rolling contact of the rolling elements with the raceways, the bearing capacity of the bearing ring is deteriorated. Frequently, the axial and the radial design space available for the accommodation of the angular contact bearing is tightly designed so that the dimensions of the bearing ring have no place for such valley channels. Moreover, for being able to receive the TCE's, the bearing rings must have generous radial and axial dimensions, and this has a detrimental effect on their material requirement and their weight.

SUMMARY OF THE INVENTION

The object of the invention is to provide rolling bearings comprising at least one lash compensation element possessing temperature-dependent extendably arranged on one bearing ring of the rolling bearing, which lash compensation element is surrounded at least partially by an angular ring profile, with which rolling bearings the aforesaid drawbacks are eliminated.

The invention concerns a rolling bearing comprising at least one lash compensation element (TCE) possessing temperature-dependent extendably arranged on one bearing ring of the rolling bearing, said lash compensation element being surrounded at least partially by an angular ring profile. In the simplest form, the angular ring profile comprises in any longitudinal section viewed along the axis of rotation of the rolling bearing, two legs that are at a right angle to each other. One of the legs describes a hollow cylinder extending concentrically to the axis of rotation, and in a longitudinal section, said leg is oriented in axial direction, axially parallel to the axis of rotation. The other leg, as viewed in a longitudinal section, is directed vertically, that is to say radially to the axis of rotation and describes an annular disk extending concentrically to the axis of rotation of the rolling bearing. Both legs (i.e., the annular disk and the hollow cylinder of the ring profile) are preferably made as a single solid piece.

According to the invention, the ring profile is retained by the leg which is directed axially parallel to the axis of the rotation of the rolling bearing for limited axial movement on the bearing ring by positive axial engagement. For this purpose, the TCE is retained or guided by the ring profile for being radially immovable by positive engagement. In axial direction, the TCE bears against the bearing ring or is guided, axially supported, for axial movement and extension in the ring profile starting from the bearing ring or, preferably, from the front end of the bearing ring or from at least one section projecting axially from the bearing ring.

The axially locking positive engagement between the leg of the ring profile and the bearing ring is realized, for instance, through radial projections on the bearing ring that engage radially into corresponding recesses of the leg. The axial dimensions of the recesses are large enough in comparison to the aligned dimensions of the projections to permit relative movements of the projections in axial directions within the recesses. The magnitude of the relative movements corresponds at least to the lashes to be compensated.

According to one proposition of the invention, the leg comprises, alternatively and preferably, at least one projection that is oriented in radial direction and engages into a corresponding radial depression on the bearing ring. Radial projections on the leg with the hollow cylindrical configuration are, for instance, radially projecting knobs, circumferentially continuous edges made by bordering, circumferentially spaced sections or bent over, circumferentially continuous or interrupted edges, or sections and knobs bent in radial direction and circumferentially spaced from one another that are made preferably by cold shaping on the ring profile produced out of sheet metal. Alternatively, it is also conceivable to provide snap lugs that engage behind corresponding undercuts on the bearing ring. Radial depressions are, for instance, radially directed holes or circumferential grooves in the bearing ring.

According to other embodiments of the invention, the axially directed leg comprises at least one section, projection or bead pointing in radial direction or a snap lug that engages behind a corresponding radial section, projection or bead or behind at least one snap lug on the bearing ring.

According to one embodiment of the invention, the ring profile is a U-shaped profile that, in the longitudinal section, is configured along the longitudinal axis. Accordingly, the leg comprising the positive engagement element is one of two legs of the angular U-shaped profile extending axially parallel to the axis of rotation. The lash compensation element is surrounded at least on three sides by the ring profile and guided by the ring profile on the hearing ring, for being radially immovable by positive engagement and axially displaceable relative to the bearing ring.

According to another embodiment of the invention, both legs of the U-shaped ring profile comprise positive engagement elements protruding in radial direction. Because the legs are situated radially opposite each other, the projections on the one leg point in an opposite radial direction to the other projections on the radially opposing leg.

According to a further embodiment of the invention, at least one axial section of the bearing ring on which the lash compensation element acts protrudes axially into the ring profile between the two legs of the U-shaped ring profile directed in axial direction. For this purpose, the legs are situated radially opposite each other and receive the section radially between each other, so that one leg of the ring profile adjoins the section radially on the inner side and the other, opposing leg adjoins the section radially on the outer side. The legs may bear against the section in radial direction or be arranged with lash relative to the section. The section can be the axial ring-shaped end of the bearing ring, so that the lash compensation element bears axially against the front end of this bearing ring and at least the disk-shaped web between the legs of the U-shaped ring profile covers the front end of the bearing ring completely. Alternatively, the at least one section is formed by at least one, but also by two or more projections which protrude axially from the bearing ring. The one projection is a hollow cylindrical section whose radial dimension is smaller than that of the bearing ring or which has the same radial dimensions as the bearing ring. Preferably, the section has a hollow cylindrical configuration and can have the same radial dimensions as the shoulder of the bearing ring. Alternatively, the radial dimensions of the section can also be larger or smaller than those of the shoulder.

The bearing ring on which the ring profile is fixed by positive engagement is either inner ring or, preferably, an outer ring.

The lash compensation element is a TCE possessing a temperature-dependent extendably and made preferably out of a plastics material. The material of the lash compensation element has a different, preferably higher thermal expansion coefficient than a material out of which the housing is made. Alternatively or at the same time, the lash compensation element is made at least of one material that possesses a different thermal expansion coefficient from a material out of which the bearing ring is made.

According to one development of the invention, the TCE bears in one direction axially against the bearing ring and in an opposite axial direction against a radially oriented cross-connection. The cross-connection is a radial connection that is to say, a preferably annular disk-shaped web between the legs of the ring profile. Thus, the TCE is encapsulated radially inwards and outwards, as also in direction of one front end, by the ring profile and in direction of the opposite front end, by the front end of the bearing ring.

The lash compensation element is connected by gluing (also vulcanization) or by fusion of material by welding to the bearing ring, or it is inserted loosely into the ring profile between the bearing ring and the web of the U-shaped ring profile. Alternatively, the TCE is frontally connected to the cross-connection. The cooperation of the TCE with the ring profile functions substantially due to the fact that the TCE can expand freely in axial direction within the ring profile.

The invention likewise concerns a rolling bearing in the form of a pre-assembled unit which is pre-assembled with the lash compensation element and the ring profile. For this purpose, the lash compensation element is either fixed by positive engagement on the bearing ring and the ring profile is then pushed axially onto the bearing ring, or the lash compensation element is inserted between the bearing ring and the ring profile, following which the ring profile is plugged onto the bearing ring.

Alternatively, the invention concerns radial and axial as also angular contact rolling bearings in the form of ball bearings, cylinder roller hearings or taper roller bearings The advantage of the invention resides particularly in the fact that such an arrangement does not require more radial design space than a prior art arrangement without lash compensation element and can thus be used in existing constructions, for example, in power take-off gears of automotive vehicles. Compared to prior art arrangements in which TCE's are used, the bearing rings are not weakened because it is no longer necessary to provide a valley channel in the dimensions of the TCE for accommodating the lash compensation element, but at the most, a recess in the thickness of the respective leg of the ring profile. Because the ring profile is preferably made of thin-walled sheet metal, the hearing ring is hardly weakened by this measure. In the dimensioning of the bearing rings therefore, the place for accommodating a TCE no longer needs to be taken into account, so that, under certain circumstances, the bearing rings can be designed with smaller dimensions. Consequently, the design space of the transmission can be reduced on the whole, while the weight is reduced and material requirement is kept at a lower level. Due to the one or more radial projections, the TCE is reliably retained on the bearing ring concerned both prior to mounting of the rolling bearing for example in a transmission or during its operation.

BRIEF DESCRIPTION OF THE DRAWINGS

The invention will now described more closely with reference to examples of embodiment.

DETAILED DESCRIPTION OF THE INVENTION

Figure 1:
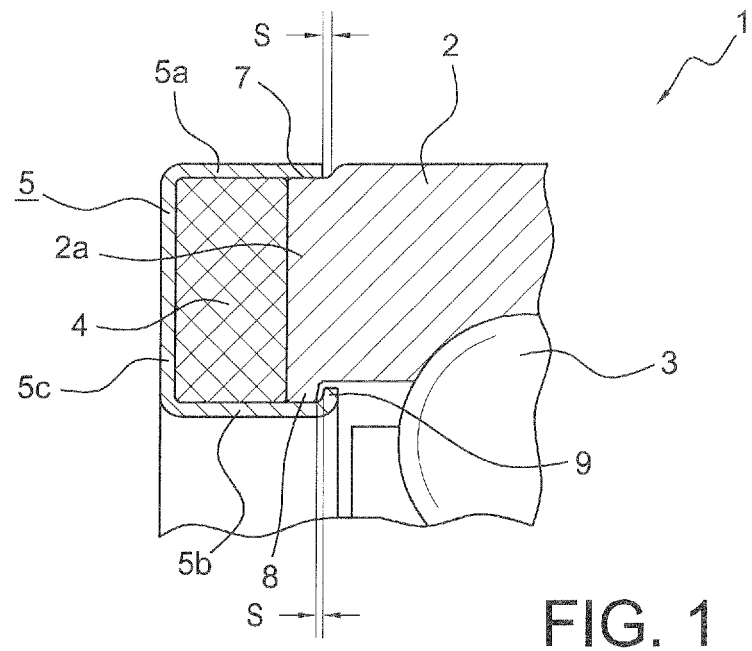
FIG. 1 illustrates a sectional view of a first embodiment of a rolling bearing of the present invention.

FIG. 1 shows a detail of a longitudinal section through a rolling bearing 1. The rolling bearing 1 comprises at least one bearing ring 2, rolling elements 3 in the form of balls and a lash compensation element 4 possessing temperature-dependent extendably. The bearing ring 2 in this case an outer bearing ring of the rolling hearing but, alternatively, the bearing ring can also be an inner bearing ring of a rolling hearing. The lash compensation element 4 is surrounded by an angular ring profile 5. The ring profile comprises two legs 5a and 5b directed axially parallel to the axis of rotation of the rolling bearing 1. The legs 5a and 5b have a hollow cylindrical configuration and are connected to each other in radial directions by a cross-connection 5c in the form of an annular disk.

The bearing ring 2 comprises, on an outer side, a radial depression 7 that forms an inner corner so that the diameter of the bearing ring 2 is reduced in a step shape radially on the outer side, into which inner corner the leg engages axially. The radial dimension of the depression 7 corresponds at least to the radial thickness of the leg 5a that is made out of sheet metal. Further, the bearing ring 2 comprises on an inner side a radially protruding projection 8 which can be formed by a circumferential collar or by a plurality of circumferentially neighboring projections. The leg 5b bears radially on an inner side against the projection 8 and engages behind this projection 8 with a projection 9 bent over radially from the leg 5b. The projection 9 is a circumferential collar or is formed by circumferentially neighboring projections and through this projection 9, the ring profile 5 is retained by positive engagement for axial movement on the bearing ring 2.

The thermal expansion coefficient of the lash compensation element 4 is higher than that of the materials light metal and steel. The lash compensation element 4 bears in one direction axially against the hearing ring 2 and in an opposite axial direction against the radially directed cross-connection 5c between the legs 5a and 5b of the ring profile 5. The lash compensation element 4 is retained radially on the bearing ring 2 by the ring profile 5 by positive engagement by the fact that the lash compensation element 4 is supported through the legs 5a and 5b to be radially immovable on a section 2a of the bearing ring 2 projecting between the legs 5a and 5b into the U-shaped profile.

Between the projection 9 and the projection 8 is formed an axial spacing S by which the lash compensation element is at least extensible out of the represented initial state because the ring profile 5 is guided for axial movement through this dimension S on the bearing ring 2. When the dimension S has been overcome, the projections 8 and 9 bear against each other as stops. In this way, the ring profile 5 is prevented from slipping off the bearing ring 2 during transportation of the rolling bearing prior to mounting of the rolling bearing in the surrounding structure and during operation in the installed state.

Figure 2:
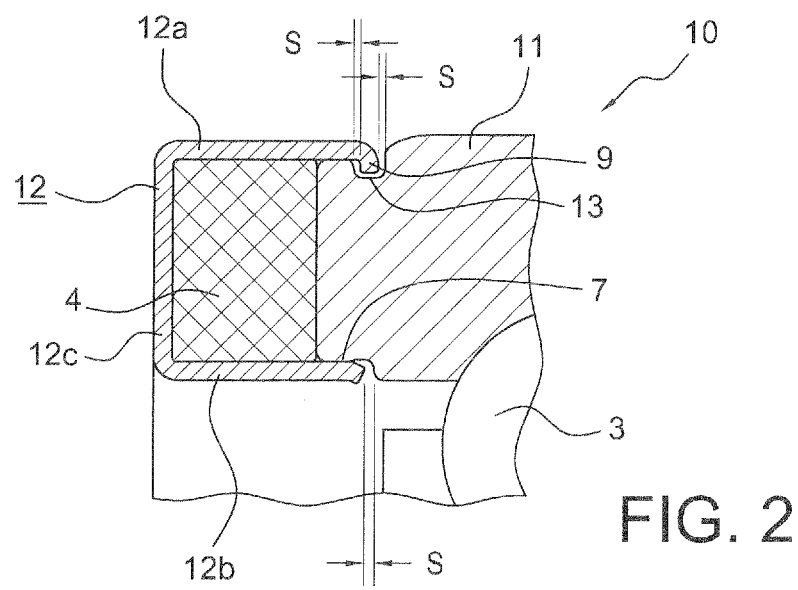
FIG. 2 illustrates a sectional view of a second embodiment of the rolling bearing.

FIG. 2 shows a detail of a longitudinal section through a rolling bearing 10. The rolling bearing comprises at least one bearing ring 11, rolling elements 3 in the form of balls and a lash compensation element 4 possessing temperature-dependent extendably. The bearing ring 11 in this case is an outer bearing ring of the rolling bearing 10 but, alternatively, the bearing ring can also be an inner hearing ring of a rolling bearing. The lash compensation element 4 is surrounded by an angular ring profile 12. The ring profile 12 comprises two legs 12a and 12b directed axially parallel to the axis of rotation of the rolling bearing 10. The legs 12a and 12b have a hollow cylindrical configuration and are connected to each other in radial directions by a cross-connection 12c in the form of an annular disk.

The thermal expansion coefficient of the lash compensation element 4 is higher than that of the materials light metal and steel. The lash compensation element 4 bears in one direction axially against the bearing ring 11 and in an opposite axial direction against the radially directed cross-connection 12c between the legs 12a and 12b of the ring profile 5. The lash compensation element 4 is retained radially on the bearing ring 11 by the ring profile 12 by the fact that the lash compensation element 4 is supported through the legs 12a and 12b to be radially immovable on a section 11a of the bearing ring 11 between the legs 12a and 12b.

The bearing ring 2 comprises, radially on an inner side, a radial depression 7 which forms an inner corner so that the inner diameter of the bearing ring 11 is radially enlarged on an inner step. The leg 12b situated radially on the inner side engages axially into the radial depression 7 for being loosely axially movable. The radial dimension of the depression 7 corresponds at least to the radial thickness of the leg 12b that is made out of sheet metal. Further, the bearing ring 2 comprises, on an outer side, a radial depression 13 that is an annular groove. The leg 12a comprises a radially bent over projection 9 that is a circumferential collar or can be formed by a plurality of circumferentially neighboring projections. The projection 9 engages radially into the depression 13 so that the ring profile 12 is retained by positive engagement for axial movement on the bearing ring 11.

Axially on the side of the projection 9 in the depression 13 freedom of movement in axial directions is created in a shown initial position with the distance S within which the lash compensation element 4 can expand or contract in a respective axial direction at least out of the initial position because it is only after the distances S have been overcome that the ring profile 12 bears with the projection 9 against the respective edge of the depression 13. When the rolling bearing 11 has been mounted in the surrounding structure, the stops prevent the ring profile 12 from slipping off the outer bearing ring 11 which would cause the lash compensation element 4 to lose its defined geometric shape. Prior to mounting, the engagement of the projection 9 into the depression 13 constitutes a mounting safety device against loss of the lash compensation element 4.

Figure 3:
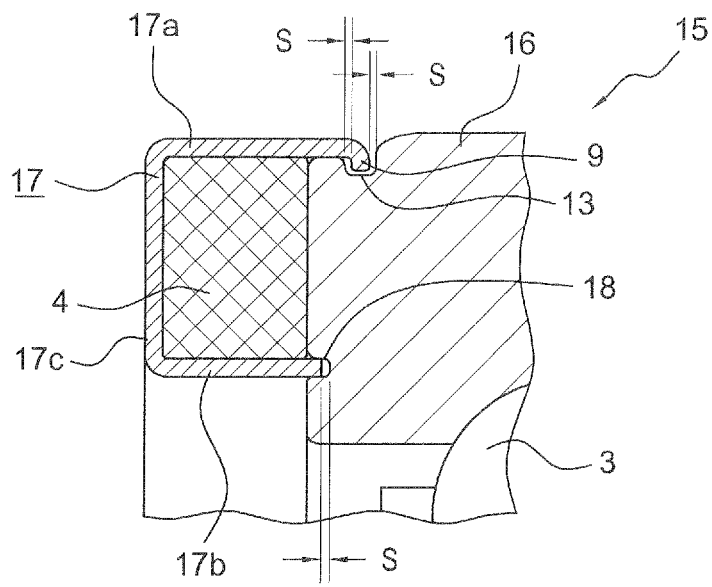
FIG. 3 illustrates a sectional view of a third embodiment of the rolling hearing.

FIG. 3 shows a detail of a longitudinal section through a rolling bearing 15. The rolling bearing 15 comprises at least one bearing ring 16, rolling elements 3 in the form of balls and a lash compensation element 4 possessing temperature-dependent extendably. The bearing ring 16 in this case is an outer bearing ring of the rolling bearing 15 but, alternatively, the bearing ring can also be an inner bearing ring of a rolling bearing. The lash compensation element 4 is surrounded by an angular ring profile 17. The ring profile 17 comprises two legs 17a and 17b directed axially parallel to the axis of rotation of the rolling bearing 10. The legs 17a and 17b have a hollow cylindrical configuration and are connected to each other in radial directions by a cross-connection 17c in the form of an annular disk.

On a front end the bearing ring 16 comprises an axial groove 18 into which the leg 17b plunges in axial direction and in which the leg 17 is guided in radial direction. The radial dimension of the axial groove corresponds at least to the radial thickness of the leg 17b, that is made out of sheet metal, plus a slight radial lash. The slight radial lash permits an axial movement of the leg 17 by a dimension S into the axial groove without which the leg clamps.

Further, the bearing ring 16 comprises on an outer side a radial depression 13 that is an annular groove. The leg 17a comprises a radially bent over projection 9 that is a circumferential collar or can be formed by circumferentially neighboring projections. The projection 9 engages radially into the depression 13, so that the ring profile 17 is retained by positive engagement for axial movement on the bearing ring 16.

Axially on the side of the projection 9 in the depression 13 freedom of movement in axial directions is created in a shown initial position with the distance S within which the lash compensation element 4 can expand or contract in a respective axial direction at least out of the initial position because it is only after the distances S have been overcome that the ring profile 17 bears with the projection 9 against the respective edge of the depression 13. When the rolling bearing 15 has been mounted in the surrounding structure, the stops prevent the ring profile 17 from slipping off the outer bearing ring 16 which would cause the lash compensation element 4 to lose its defined geometric shape. Prior to mounting, the engagement of the projection 9 into the depression 13 constitutes a mounting safety device against loss of the lash compensation element 4.

The thermal expansion coefficient of the lash compensation element 4 is higher than that of the materials light metal and steel. The lash compensation element 4 bears in one direction axially against the bearing ring 16 and in an opposite axial direction against the radially directed cross-connection 17c between the legs 17a and 17b of the ring profile 17. The lash compensation element 4 is retained radially by the ring profile 17 on the bearing ring 16 by the fact that the lash compensation element 4 is supported through the legs 17a and 17b on the bearing ring 16 to be radially immovable, the leg 17h being secured in the axial groove on both sides by positive engagement on the bearing ring 16.

Figure 4:
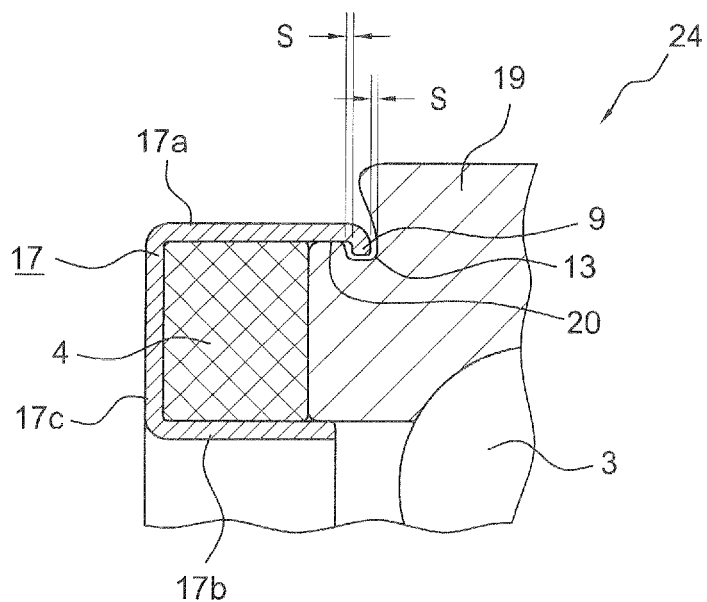
FIG. 4 illustrates a sectional view of a fourth embodiment of the rolling bearing.

FIG. 4 shows a detail of a longitudinal section through a rolling bearing 24. The rolling hearing 24 comprises at least one bearing ring 19, rolling elements 3 in the form of balls and a lash compensation element 4 possessing temperature-dependent extendably. The hearing ring 19 in this case is an outer bearing ring of the rolling bearing 24 but, alternatively, the bearing ring can also be an inner bearing ring of a rolling bearing. The lash compensation element 4 is surrounded by an angular ring profile 17. The ring profile 17 comprises two legs 17a and 17b directed axially parallel to the axis of rotation of the rolling bearing 10. The legs 17a and 17b have a hollow cylindrical configuration and are connected to each other in radial directions by a cross-connection 17c in the form of an annular disk.

The thermal expansion coefficient of the lash compensation element 4 is higher than that of the materials light metal and steel. The lash compensation element 4 bears in one direction axially against the bearing ring 16 and in an opposite axial direction against the radially directed cross-connection 17c between the legs 17a and 17b of the ring profile 17. The lash compensation element 4 is retained radially on the bearing ring 16 by the ring profile 17 by the fact that the lash compensation element 4 is supported through the legs 17a and 17b to be radially immovable on a section 16a of the bearing ring between the legs 17a and 17b.

The bearing ring 19 comprises, on an outer side, a radial depression 20 which forms an inner corner so that the diameter of the bearing ring 19 is reduced in a step shape radially on the outer side and the leg 17a engages axially into this corner. The radial dimension of the depression 7 is larger than the radial sheet metal thickness of the leg 17a.

The bearing ring 19 further comprises, on an outer side, in the corner of the radial depression 20, a further radial depression 13 that is an annular groove. The leg 17a comprises a radially bent over projection 9 that is a circumferential collar or can be formed by circumferentially neighboring projections. The projection 9 engages radially into the depression 13 so that the ring profile 17 is retained by positive engage for axial movement on the bearing ring 19.

In the shown initial position, axially on the side of the projection 9 in the depression 13 freedom of movement in axial directions is created with the distance S within which the lash compensation element 4 can expand or contract in a respective axial direction at least out of the initial position because it is only after the distances S have been overcome that the ring profile 19 bears with the projection 9 against the respective edge of the depression 13. When the rolling bearing 24 has been mounted into the surrounding structure, the stops prevent the ring profile 17 from slipping off the outer bearing ring 19 which would cause the lash compensation element 4 to lose its defined geometric shape. Prior to mounting, the engagement of the projection 9 into the depression 13 constitutes a mounting safety device against loss of the lash compensation element 4.

Figure 5:
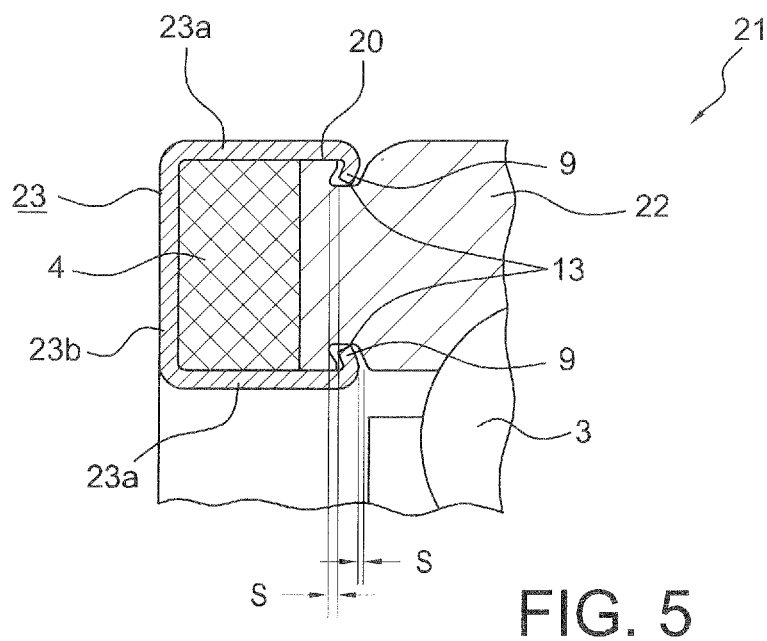
FIG. 5 illustrates a sectional view of a fifth embodiment of the rolling hearing.

FIG. 5 shows a detail of a longitudinal section through a rolling bearing 21. The rolling bearing 21 comprises at least one bearing ring 22, rolling elements 3 in the form of balls and a lash compensation element 4 possessing temperature-dependent extendably. The bearing ring 22 in this case is an outer bearing ring of the rolling bearing 21 but, alternatively, the bearing ring can also be an inner bearing ring of a rolling hearing. The lash compensation element 4 is surrounded by an angular ring profile 23. The ring profile 23 comprises two legs 23a directed axially parallel to the axis of rotation of the rolling bearing 21. The legs 23a have a hollow cylindrical configuration and are connected to each other in radial directions by a cross-connection 23b in the form of an annular disk.

The thermal expansion coefficient of the lash compensation element 4 is higher than that of the materials light metal and steel. The lash compensation element 4 bears in one direction axially against the bearing ring 22 and in an opposite axial direction against the radially directed cross-connection 23b between the legs 23a of the ring profile 23, The lash compensation element 4 is retained radially by the ring profile 23 on the bearing ring 22 by the fact that the lash compensation element 4 is supported by the legs 23a to be radially immovable on the bearing ring 22.

The hearing ring 22 comprises on a radially outer side a radial depression 20 which forms an inner corner so that the diameter of the bearing ring 22 is reduced in a step shape radially on the outer side and the radially outer leg 23a engages axially into this inner corner. The radial dimension of the depression 7 corresponds approximately to the radial sheet metal thickness of the leg 23a.

The bearing ring 22 comprises, on a radially inner and a radially outer side, a radial depression 13 that is an annular groove, the radially outer depression being configured in the corner of the depression 20. Each leg 23a comprises a radially bent over projection 9 that is a circumferential collar or can be made up of circumferentially neighboring projections. The projection 9 engages radially into the depression 13 so that the ring profile 23 is retained by positive engagement axially movable on the bearing ring 22.

Axially on the side of the projection 9 and the edge of the depression 13 freedom of movement in axial direction is created in a shown initial position with the distance S within which the lash compensation element 4 can expand or contract in a respective axial direction at least out of the initial position because it is only after the distances S have been overcome that the ring profile 23 bears with the projections 9 against the respective edge of the depression 13. When the rolling bearing 21 has been mounted in the surrounding structure, the stops prevent the ring profile 21 from slipping off the outer bearing ring 22 which would cause the lash compensation element 4 to lose its defined geometric shape. Prior to mounting, the engagement of the projection 9 into the depressions 13 constitutes a mounting safety device against loss of the lash compensation element 4.

Figure 6:
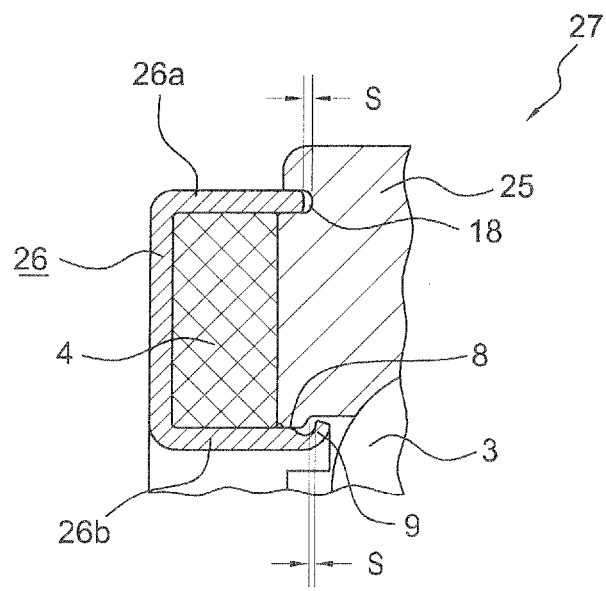
FIG. 6 illustrates a sectional view of a sixth embodiment of the rolling bearing.

FIG. 6 shows a detail of a longitudinal section through a rolling bearing 27. The rolling bearing 27 comprises at least one bearing ring 25, rolling elements 3 in the form of balls and a lash compensation element 4 possessing temperature-dependent extendably. The bearing ring 25 in this case is an outer bearing ring of the rolling hearing 27 but, alternatively, the bearing ring can also be an inner bearing ring of a rolling bearing. The lash compensation element 4 is surrounded by an angular ring profile 26. The ring profile 26 comprises two legs 26a and 26b directed axially parallel to the axis of rotation of the rolling bearing 10. The legs 26a and 26b have a hollow cylindrical configuration and are connected to each other in radial directions by a cross-connection 26c in the form of an annular disk.

The thermal expansion coefficient of the lash compensation element 4 is higher than that of the materials light metal and steel. The lash compensation element 4 bears in one direction axially against the bearing ring 25 and in an opposite axial direction against the radially directed cross-connection 26c between the legs 26a and 26h of the ring profile 26. The lash compensation element 4 is retained radially by the ring profile 26 on the bearing ring 25 by the fact that the lash compensation element 4 is supported by the legs 26a and 26b to be radially immovable on the bearing ring 25.

On a front end the bearing ring 25 comprises an axial groove 18 into which the leg 26a plunges in axial direction and in which the leg 26a is guided in radial direction. The radial dimension of the axial groove corresponds at least to the radial thickness of the leg 26a, that is made of sheet metal, plus a slight radial lash. The slight radial lash permits an axial movement of the leg 26a by a dimension S into the axial groove without which the leg clamps.

Radially on an inner side, the leg 26b bears against a radial projection 8 and engages behind the projection 8 with a projection 9 that is bent over radially from the leg 26b and in whose peripheral neighborhood, further projections are provided. The projection 9 retains the ring profile 26 for axial movement on the bearing ring 25. Between the projection 9 and the projection 8 is configured an axial spacing S by which the lash compensation element can at least expand or contract in axial direction out of the represented initial state because the ring profile 26 is guided for axial movement on the bearing ring 2 through this dimension S. When the dimension S has been overcome, the projections 8 and 9 bear axially against each other as stops. In this way, the ring profile 26 and, thus also, the lash compensation element are prevented from slipping off the bearing ring 2 during transportation of the rolling bearing prior to mounting of the rolling bearing in the surrounding structure and during operation in the installed state.

What is claimed:

1. A rolling bearing, comprising:
   at least one lash compensation element possessing temperature dependence extendably arranged on one bearing ring of the roiling bearing; and
   an angular ring profile at least partially surrounding said lash compensation element, said ring profile having two legs directed axially parallel to an axis of rotation of the roller bearing, wherein the legs are connected to each other by a radially directed cross-connection, the ring profile being retained by at least one of the legs by positive axial engagement for limited axial movement on the bearing ring such that the lash compensation element is supported by the ring profile by positive engagement so as to be radially immovable on the bearing ring while being guided for axial movement on the bearing ring, wherein the bearing ring has at least one axial section that plunges axially between the legs of the ring profile which are axially directed and radially opposing.

2. The rolling bearing according to claim 1, wherein the bearing ring engages in an axial direction through at least one part of the at least one of the legs behind an undercut.

3. The rolling bearing according to claim 2, wherein the at least one of the legs comprises at least one section that points in a radial direction, and the bearing ring has a radial projection situated between the lash compensation element and the section, and through the section, the at least one of the legs engages behind the radial projection on the bearing ring.

4. The rolling bearing according to claim 1, wherein said lash compensation element is surrounded at least on three sides by the ring profile.

5. The rolling bearing according to claim 4, wherein the ring profile is retained by each of the legs by positive engagement for limited axial movement.

6. The rolling bearing according to claim 4, wherein the bearing ring has an axial groove configuration in a front end of the bearing ring and the at least one of the legs is guided in the axial groove so as to be radially immovable and axially movable relative to the bearing ring.

7. The rolling bearing according to claim 4, wherein the lash compensation element bears in one direction axially against the bearing ring and in an opposite axial direction against the radially directed cross-connection between the legs of the ring profile.

8. The rolling bearing according to claim 1, wherein the lash compensation element is a thermo compensation element made at least of one material that possesses a different thermal extension coefficient from materials of light metal alloys or of steel.

9. A rolling bearing, comprising:
  at least one lash compensation element possessing temperature dependence extendably arranged on one bearing ring of the rolling bearing; and
  an angular ring profile at least partially surrounding said lash compensation element, said ring profile having two legs directed axially parallel to an axis of rotation of the roller bearing, wherein the legs are connected to each other by a radially directed cross-connection, the ring profile being retained by at least one of the legs by positive axial engagement for limited axial movement on the bearing ring such that the lash compensation element is supported by the ring profile by positive engagement so as to be radially immovable on the bearing ring while being guided for axial movement on the bearing ring, wherein the ring profile is retained by each of the legs by positive engagement for limited axial movement.

* * * * *